United States Patent
Kawamura et al.

(10) Patent No.: US 9,916,115 B2
(45) Date of Patent: Mar. 13, 2018

(54) PROVIDING ACCESS TO VIRTUAL SEQUENTIAL ACCESS VOLUME

(71) Applicant: INTERNATIONAL BUSINESS MACHINES CORPORATION, Armonk, NY (US)

(72) Inventors: Kousei Kawamura, Tokyo (JP); Koichi Masuda, Tokyo (JP); Sosuke Matsui, Tokyo (JP); Yutaka Oishi, Kawasaki (JP); Takahiro Tsuda, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 161 days.

(21) Appl. No.: 15/083,393

(22) Filed: Mar. 29, 2016

(65) Prior Publication Data

US 2017/0285958 A1  Oct. 5, 2017

(51) Int. Cl.
*G06F 3/06* (2006.01)
*G06F 12/02* (2006.01)

(52) U.S. Cl.
CPC ........... *G06F 3/065* (2013.01); *G06F 3/0611* (2013.01); *G06F 3/0655* (2013.01); *G06F 3/0664* (2013.01); *G06F 3/0682* (2013.01); *G06F 12/0292* (2013.01)

(58) Field of Classification Search
CPC .... G06F 3/0611; G06F 3/0643; G06F 3/0647; G06F 3/0655; G06F 3/0682; G06F 12/0292; G06F 12/0868
See application file for complete search history.

(56) References Cited

U.S. PATENT DOCUMENTS

| | | | |
|---|---|---|---|
| 6,983,351 B2 | 1/2006 | Gibble et al. | |
| 7,647,448 B2 | 1/2010 | Linder | |
| 8,205,041 B2 | 6/2012 | Otsuka | |
| 8,341,346 B2 | 12/2012 | Ashton et al. | |
| 2011/0283077 A1* | 11/2011 | Cammarata | G06F 3/0619 711/170 |
| 2011/0320679 A1* | 12/2011 | Ashton | G06F 12/02 711/4 |
| 2012/0265954 A1* | 10/2012 | Haustein | G06F 3/061 711/160 |
| 2014/0181396 A1 | 6/2014 | Vincent | |

(Continued)

OTHER PUBLICATIONS

IBM, "Deleting Expired Virtual Tape Server Logical Volume Data", z/OS DFSMS OAM Planning, Installation, and Storage Administration Guide for Tape Libraries, printed on Nov. 27, 2015, pp. 1-2, https://www-01.ibm.com/support/knowledgecenter/SSLTBW_2.1.0/com.ibm.zos.v2r1.idao300/delvtsda.htm.

*Primary Examiner* — Hal Schnee
(74) *Attorney, Agent, or Firm* — L. Jeffrey Kelly

(57) ABSTRACT

A computer-implemented method for providing access to plural virtual sequential access volumes by using random access media, includes: accepting an operation for writing first data to a specific virtual sequential access volume of the plural virtual sequential access volumes; and storing a first file including the first data in the random access media, the first file being separate from a second file including second data stored in the random access media in response to an operation for writing the second data to the specific virtual sequential access volume.

20 Claims, 9 Drawing Sheets

(56) References Cited

U.S. PATENT DOCUMENTS

| | | | |
|---|---|---|---|
| 2015/0293700 A1* | 10/2015 | Sasaki | G06F 3/061 711/113 |
| 2016/0092131 A1* | 3/2016 | Nakajima | G06F 3/0661 711/111 |

* cited by examiner

FIG.6

FILE OPERATION MODULE (140)

Control Table #1

| Data Unit Name | Start Position | ... | End Position | Segmented Virtual Tape File Name |
|---|---|---|---|---|
| ... | ... | ... | ... | ... |

Control Table #2

| Data Unit Name | Start Position | ... | End Position | Segmented Virtual Tape File Name |
|---|---|---|---|---|
| ... | ... | ... | ... | ... |

Control Table #M

| Data Unit Name | Start Position | ... | End Position | Segmented Virtual Tape File Name |
|---|---|---|---|---|
| HOSTFILE1 | 0 | ... | 150 | M-1 |
| HOSTFILE2 | 150 | ... | 250 | M-2 |
| HOSTFILE3 | 250 | ... | 300 | M-3 |
| ... | ... | ... | ... | ... |
| HOSTFILEN | 50060 | ... | 50500 | M-N |

PROVIDING ACCESS TO VIRTUAL SEQUENTIAL ACCESS VOLUME

BACKGROUND

The present invention relates to providing access to virtual sequential access volumes, and more specifically, to providing access to plural virtual sequential access volumes by using random access media.

Recently, various techniques have been known regarding providing access to plural virtual sequential access volumes by using random access media in a Virtual Tape Server (VTS). A VTS is a tape library virtualization storage product that is a digital disk storage system but behaves as a physical tape library for a host. The host can write data in a disk on the virtual tape server (VTS), by using backup application that controls a conventional physical tape library, in the same manner as in writing data in a physical tape volume. In typical VTS systems the units of data, which the host stores in one physical tape volume, are treated as one virtual tape file and the virtual tape file is stored in a memory store

SUMMARY

According to an embodiment of the present invention, there is provided a computer-implemented method for providing access to plural virtual sequential access volumes by using random access media. The method includes accepting an operation for writing first data to a specific virtual sequential access volume of the plural virtual sequential access volumes. The method further includes storing a first file including the first data in the random access media. The first file is separate from a second file including second data stored in the random access media in response to an operation for writing the second data to the specific virtual sequential access volume.

According to another embodiment of the present invention, there is provided an apparatus for providing access to plural virtual sequential access volumes by using random access media. The apparatus includes a processor and a memory coupled to the processor. The memory includes program instructions. The program instructions are executable by the processor to cause the processor to accept an operation for writing first data to a specific virtual sequential access volume of the plural virtual sequential access volumes. The program instructions are executable by the processor to further cause the processor to store a first file including the first data in the random access media. The first file is separate from a second file including second data stored in the random access media in response to an operation for writing the second data to the specific virtual sequential access volume.

In an additional embodiment of the present invention, there is provided a computer program product for providing access to plural virtual sequential access volumes by using random access media. The computer program product includes a computer readable storage medium having program instructions embodied with the computer readable storage medium. The program instructions are executable by a computer to cause the computer to accept an operation for writing first data to a specific virtual sequential access volume of the plural virtual sequential access volumes. The program instructions are executable by a computer to further cause the computer to store a first file including the first data in the random access media. The first file being separate from a second file including second data stored in the random access media in response to an operation for writing the second data to the specific virtual sequential access volume.

BRIEF DESCRIPTION OF THE SEVERAL VIEWS OF THE DRAWINGS

FIG. 6 depicts a configuration of a file operation module in a preferred exemplary embodiment of the present invention.

DETAILED DESCRIPTION

Figure 1:
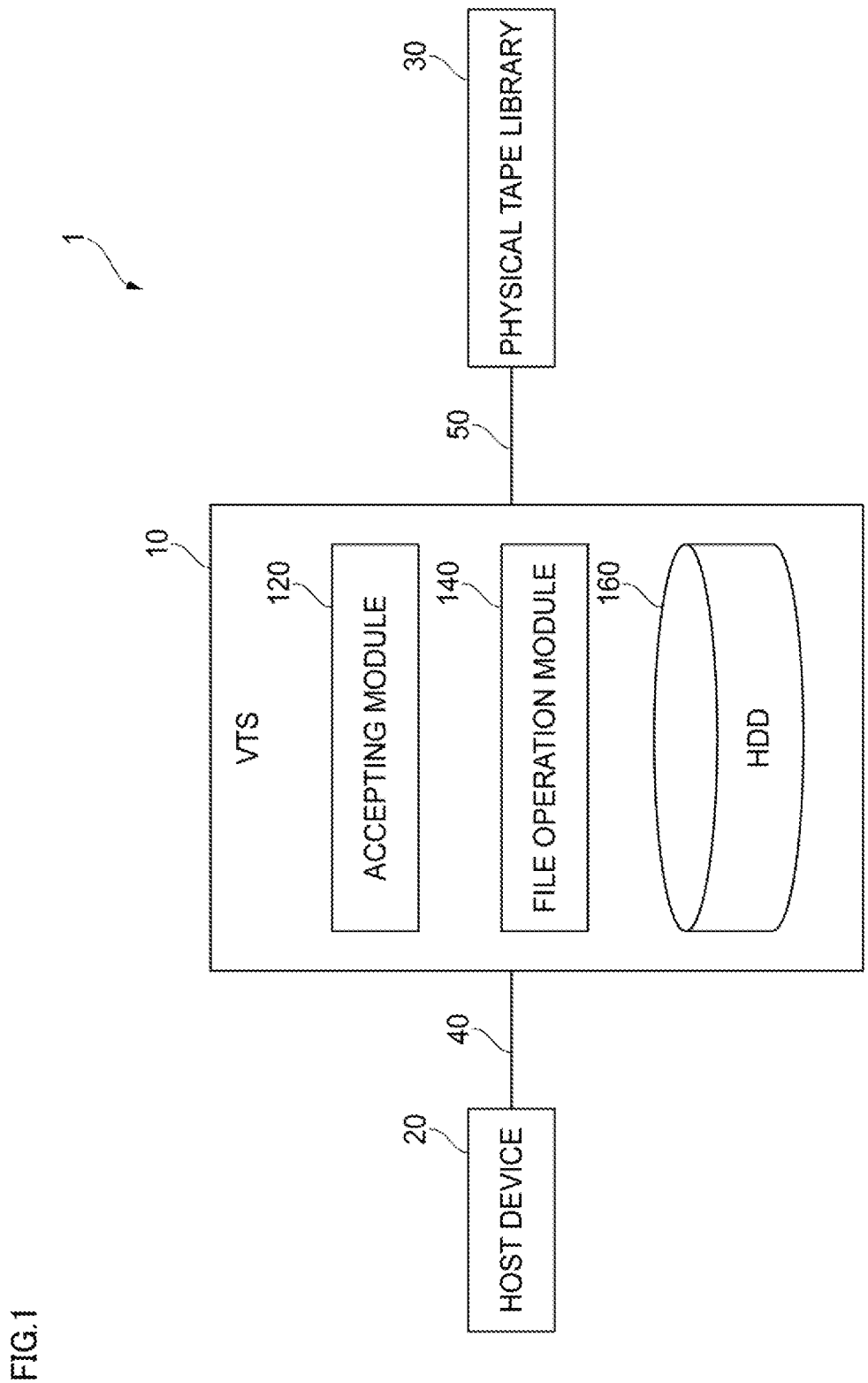
FIG. 1 depicts a block diagram of a storage system according to exemplary embodiments of the present invention.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The present invention will now be described in detail with reference to the Figures. FIG. 1 depicts a block diagram of a storage system according to exemplary embodiments of the present invention. Those in the art will appreciate that the present invention is not limited to these exemplary embodiments, as described below, and may be implemented with various modifications within the scope of the present invention. In addition, the drawings used herein are for purposes of illustration, and may not show actual dimensions. FIG. 1 depicts a storage system 1. Storage system 1 may include a virtual tape server (VTS) 10, a host device 20 connected to the VTS 10 via a communication line 40, and a physical tape library 30 connected to the VTS 10 via a communication line 50.

The VTS 10 may be a tape library virtualization storage product. This virtualization storage product may be a digital disk storage device in reality but behaves as a tape library device for the host device 20. Specifically, the VTS 10 may include an accepting module 120, a file operation module 140, and a hard disk drive (HDD) 160.

The accepting module 120 may accept a write request from the host device 20 for writing a data unit to a physical tape volume, as in an exemplary operation for writing first data to a specific virtual sequential access volume. The accepting module 120 may accept a read request for reading the data unit from the physical tape volume, as in an exemplary operation for reading the first data. The accepting module 120 may accept a deletion request for deleting the data unit in the physical tape volume, in an exemplary operation for deleting the first data. The accepting module 120 may accept an update request for updating the data unit in the physical tape volume, as in an exemplary operation for updating the first data.

The file operation module 140 may store the data unit in the HDD 160 while showing as if the data unit were stored in the physical tape volume, in response to the acceptance of the write request. The file operation module 140 may read the data unit from the HDD 160 while showing as if the data unit were read from the physical tape volume, in response to the acceptance of the read request. The file operation module 140 may delete the data unit stored in the HDD 160 while showing as if the data unit stored in the physical tape volume were deleted, in response to the acceptance of the deletion request. The file operation module 140 may update the data unit stored in the HDD 160 while showing as if the data unit stored in the physical tape volume were updated, in response to the acceptance of the update request.

The HDD 160 may include storage media serving as one example of random access media. The HDD 160 is used by the file operation module 140 for storing the data unit, instead of the physical tape volume, as in an exemplary sequential access volume. Thus, the VTS 10 may be a device providing access to virtual sequential access volumes by using random access media.

The host device 20 may hold plural data units, each of which is handled as one file. The host device 20 may store the data unit in the HDD 160 of the VTS 10, in the same manner as in storing the data unit in the physical tape volume, by connecting to the VTS 10. The host device 20 may read the data unit from the HDD 160 of the VTS 10, in the same manner as in reading the data unit from the physical tape volume, by connecting to the VTS 10. The host device 20 may delete the data unit stored in the HDD 160 of the VTS 10, in the same manner as in deleting the data unit stored in the physical tape volume, by connecting to the VTS 10. The host device 20 may update the data unit stored in the HDD 160 of the VTS 10, in the same manner as in updating the data unit stored in the physical tape volume, by connecting to the VTS 10. Thus, the host device 20 may believe access to the HDD 160 as access to the physical tape volume.

The physical tape library 30 may store the data units in plural physical tape volumes. Even without the physical tape library 30, the VTS 10 can store the data unit in the HDD 160 while showing as if the data unit were stored in the physical tape volume. In this sense, the physical tape library 30 may be optional. However, when being connected to the VTS 10 supporting the Hierarchical Storage Management (HSM), the physical tape library 30 may be used for data migration and therefore may be required. The HSM is a function, which uses disk media having a fast access speed as primary storage media and inexpensive physical tape volumes having a slow access speed as secondary storage media. The data migration is a processing in which the data units are migrated from/to the primary storage media to/from the secondary storage media.

Figure 2:
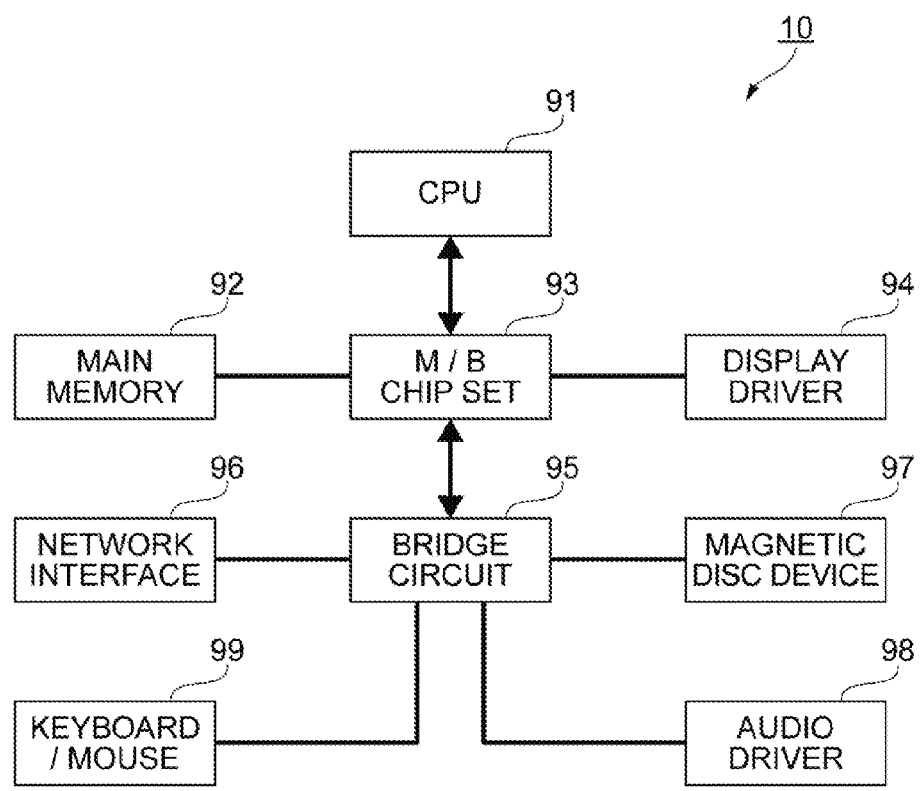
FIG. 2 depicts an example of a hardware configuration of a virtual tape server (VTS) according to exemplary embodiments of the present invention.

Referring to FIG. 2, FIG. 2 depicts an example of a hardware configuration of a virtual tape server (VTS) according to exemplary embodiments of the present invention. As shown in the FIG. 2, the VTS 10 may include a central processing unit (CPU) 91 serving as one example of a processor, a main memory 92 connected to the CPU 91 via a motherboard (M/B) chip set 93 and serving as one example of a memory, and a display driver 94 connected to the CPU 91 via the same M/B chip set 93. A network interface 96, magnetic disk device 97, audio driver 98, and keyboard/mouse 99 are also connected to the M/B chip set 93 via a bridge circuit 95.

In FIG. 2, the various configurational elements are connected via buses. For example, the CPU 91 and the M/B chip set 93, and the M/B chip set 93 and the main memory 92 are connected via CPU buses, respectively. The M/B chip set 93 and the display driver 94 may be connected via an accelerated graphics port (AGP). However, when the display driver 94 includes a PCI express-compatible video card, the M/B chip set 93 and the video card are connected via a PCI express (PCIe) bus. When the network interface 96 is connected to the bridge circuit 95, a PCI Express may be used for the connection, for example. for connecting the magnetic disk device 97 to the bridge circuit 95, a serial AT attachment (ATA), a parallel-transmission ATA, or peripheral components interconnect (PCI) may be used. For connecting the keyboard/mouse 99 to the bridge circuit 95, a universal serial bus (USB) may be used.

Figure 3:
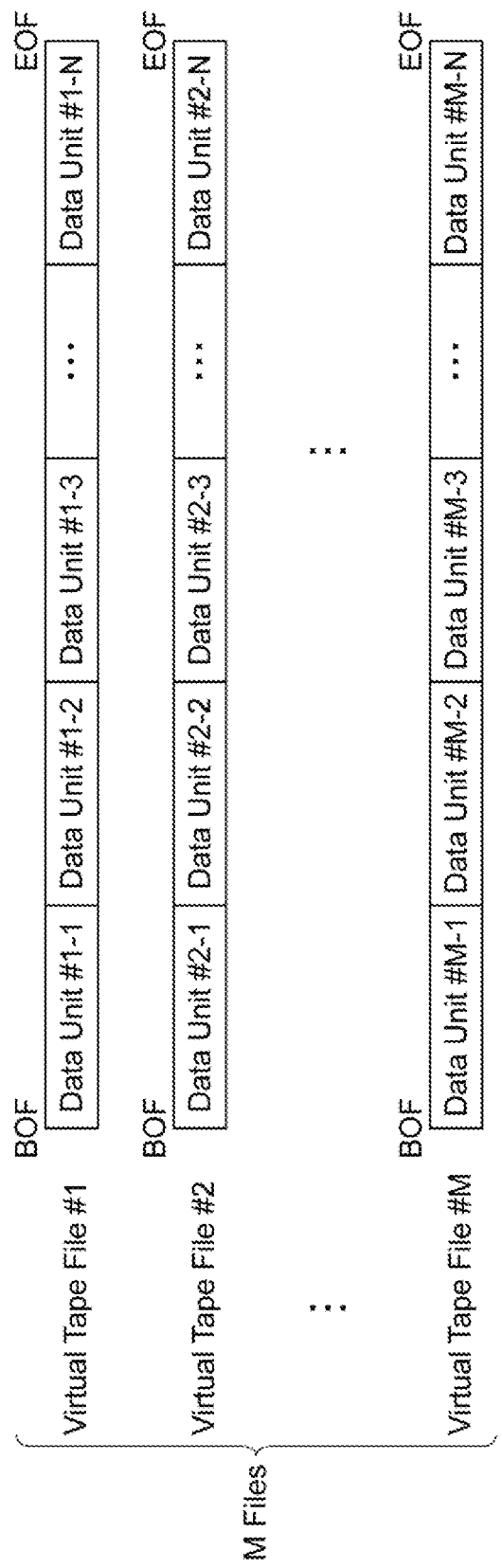
FIG. 3 depicts a general example of a storage manner in a HDD of the VTS.

Referring to FIG. 3, FIG. 3 depicts an example of a storage manner in a HDD 160 of the VTS 10. As shown in FIG. 3, the VTS 10 stores plural data units believed by the host device 20 to be stored in one physical tape volume, as one file called "virtual tape file" in the HDD 160. For example, assuming that the host device 20 believes N data units to be stored in each of M physical tape volumes, the VTS 10 stores M virtual tape files each including N data units, in the HDD 160. In this figure, a data unit #I-J (I=1, 2, . . . , M, J=1, 2, . . . , N) indicates a data unit believed by the host device 20 to be stored in the I-th physical tape volume as the J-th data unit.

As can be seen from FIG. 3, the exemplary storage manner of the HDD 160 of the VTS 10 basically follows a storage manner in the physical tape volume. The data units are sequentially stored in the physical tape volume from the beginning toward the end. Therefore, the VTS 10 stores the data units in the virtual tape file from the beginning of file (BOF) toward the end of file (EOF). Meanwhile, when a data unit in the physical tape volume is no longer needed, the data unit is only regarded as invalid and remains in the physical tape volume. Therefore, even when a data unit stored in the virtual tape file is deleted on the host device 20, the data unit is only regarded as invalid and remains in the virtual tape file.

Figure 4:
FIG. 4 depicts a virtual tape file including a data unit deleted on a host device.

Referring to FIG. 4, FIG. 4 depicts the virtual tape file including a data unit deleted on the host device 20. In FIG. 4, a data unit #3 is determined to be deleted on the host device 20, by a hatching indication. Even when deleted on the host device 20, the data unit continues to occupy the capacity of the HDD 160 as a part of the virtual tape file until all the data units in the virtual tape file are deleted or until the virtual tape file is deleted.

When performing data migration, the VTS 10 migrates plural data units from or to the primary storage media and from or to the secondary storage media on a per-virtual-tape-file basis. As discussed in the foregoing, the virtual tape file may include one or more data units, which have been deleted on the host device 20.

Figure 5:
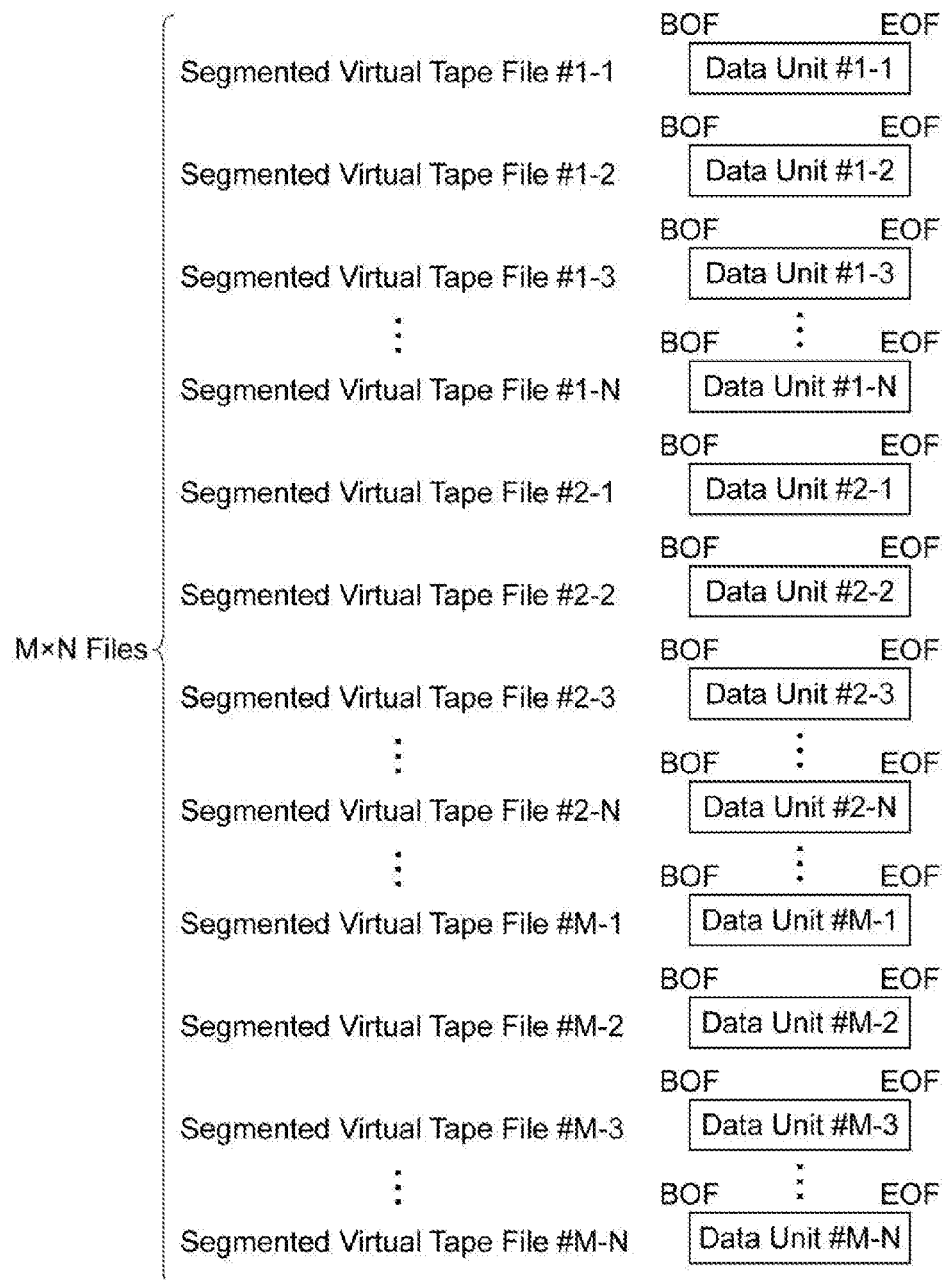
FIG. 5 depicts an example of a storage manner in a HDD of the VTS in exemplary embodiments of the present invention.

For example, banking systems have a large amount of account data, and the account data is required to be stored for a long time period. Meanwhile, the account data is apt to be frequently updated. Thus, the banking systems may easily cause a situation in which the capacity of the physical tape volume is wastefully used. Therefore, in various embodiments, the VTS 160 may segment the virtual tape file shown in FIG. 3 for each of the plural data units. Referring to FIG. 5, FIG. 5 depicts an exemplary storage in the HDD 160 of the VTS 10. As shown in the FIG. 5, the VTS 10 may store a data unit handled as one file by the host device 20, as one file called "segmented virtual tape file" in the HDD 160. The segmented virtual tape file serves as one example of a first file including the first data, as one example of a second file including second data which is separate from the first file, and as one example of a third file including third data which is obtained by updating the first data and which is separate from both the first file and the second file. For example, assuming that the host device 20 believes N data units to be stored in each of M physical tape volumes, the VTS 10 may store N x M segmented virtual tape files each including one data unit, in the HDD 160. Also in this figure, a data unit #I-J (I=1, 2, . . . , M, J=1, 2, . . . , N) indicates a data unit believed by the host device 20 to be stored in the I-th physical tape volume as the J-th data unit.

Although one segmented virtual tape file includes one data unit in FIG. 5, the structure of the segmented virtual tape file is not limited to this. For example, one segmented virtual tape file may include plural data units, if the plural data units are related. Alternatively, if the size of one data unit is large, one segmented virtual tape file may include one or more parts of the data unit.

In various embodiments, host device 20 makes an access request to a data unit believed by the host device 20 to be stored in the physical tape volume. VTS 10 may make access to the data unit stored in the HDD 160. When making the access request, the host device 20 may send the name of the physical tape volume, the name of the data unit, and position information indicating a position on the physical tape volume where the data unit is believed by the host device 20 to be stored, or, a designation of the specific virtual sequential access volume and the position in the specific virtual sequential access volume. VTS 10 may be provided with a structure enabling access to the data unit in the HDD 160 based on the aforementioned names and the position information sent by the host device 20.

Referring to FIG. 6, FIG. 6 depicts a configuration of the file operation module 140 in an exemplary embodiment. As shown in the FIG. 6, the file operation module 140 may include control tables. Each of the control tables may be provided for one physical tape volume. Further, each of the control tables may contain plural records, each including a correspondence of the name of the data unit, the position information, and the name of the segmented virtual tape file. The name of the data unit may correspond to "Data Unit Name" in FIG. 6. The position information may correspond to "Start Position" in FIG. 6 indicating a position on the physical tape volume where the head of the data unit is believed to be stored, and "End Position" in FIG. 6 indicating a position on the physical tape volume where the tail of the data unit is believed to be stored. The name of the segmented virtual tape file may correspond to "Segmented Virtual Tape File Name" in FIG. 6. Since all of the control tables may contain the similar information to a control table #M, contents of control tables other than the control table #M is omitted in the figure. Note that, the control tables may be of any type such as a file, a database or the like.

When the host device 20 makes an access request to a data unit the host device 20 may store on a physical tape volume, the VTS 10 first makes access to a control table corresponding to the physical tape volume. Next, the VTS 10 may obtain from the control table the name of a corresponding segmented virtual tape file, based on the name of the data unit and the position information sent by the host device 20. VTS 10 may then make access to the segmented virtual tape file including the data unit.

Although the control table contains the plural records, each including the name of the data unit in FIG. 6, the structure of the control table is not limited to this. For example, the control table may contain the plural records, each not including the name of the data unit, although it is included in each of the plural records in the foregoing description to improve the reliability of identifying the corresponding segmented virtual tape file.

The name of the physical tape volume may be added to each of the plural records in the control table. Thus, the record in the control table may be regarded as an example of association information associating the first file with the specific virtual sequential access volume and a position of the first data in the specific virtual sequential access volume.

Figure 7:
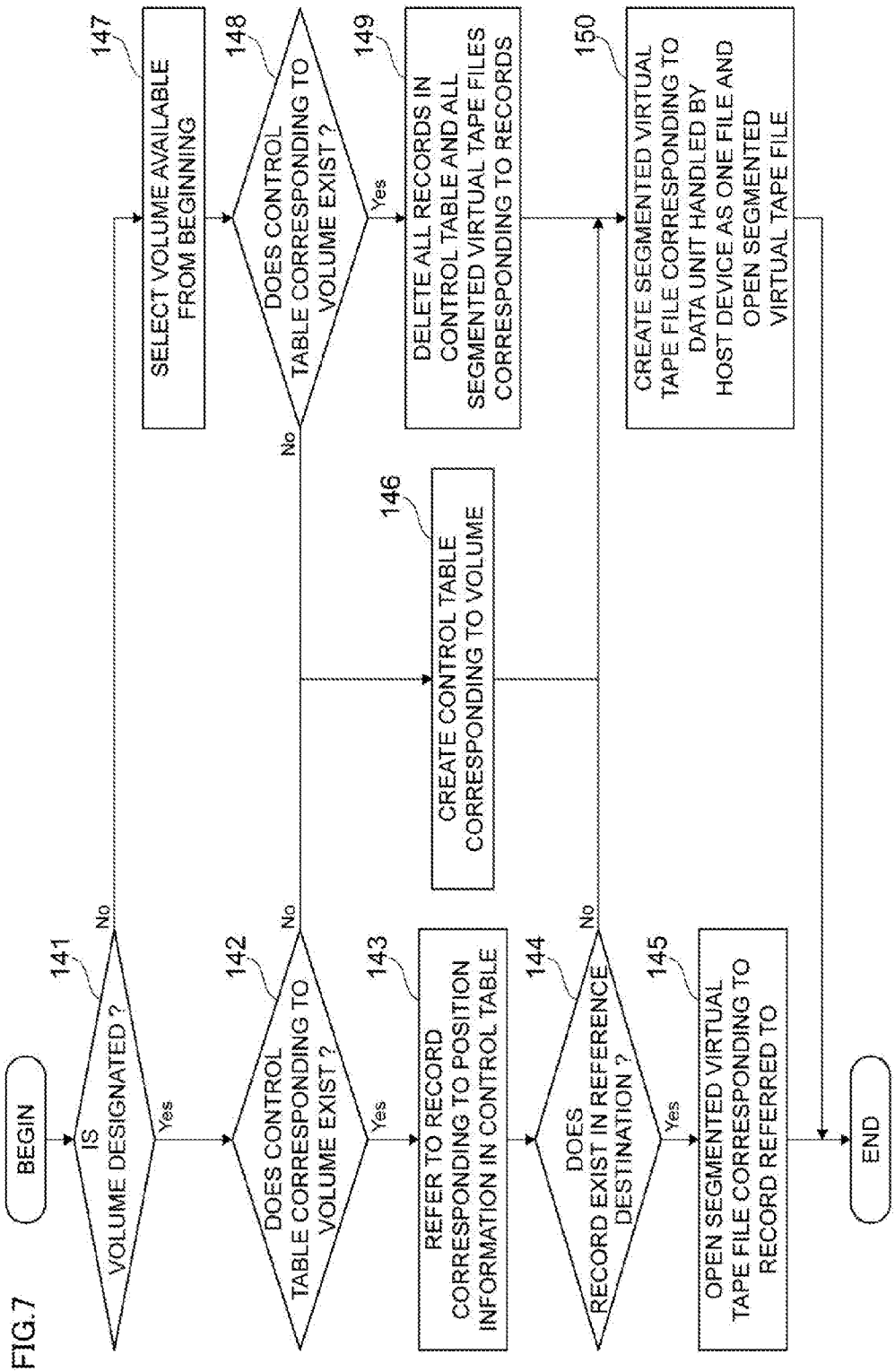
FIG. 7 depicts a flowchart representing an exemplary operation of the VTS according to a preferred exemplary embodiment of the present invention.

Referring to FIG. 7, FIG. 7 depicts a flowchart representing an exemplary operation of the VTS 10 where the host device 20 makes an access request to a data unit believed to be stored in a physical tape volume. When the host device 20 makes the access request, the accepting module 120 may accept it. If the access request is a request for reading the data unit from the physical tape volume, it may include the name of the physical tape volume, the name of the data unit, and the aforementioned position information. If the access request is a request for writing the data unit additionally to the physical tape volume, it may include the name of the physical tape volume, and the name of the data unit. If the access request is a request for writing the data unit newly to the physical tape volume from its beginning, it may include the name of the data unit. In response to an acceptance of the access request by the accepting module 120, the file operation module 140 may start this operation.

As shown in the FIG. 7, the file operation module 140 may determine whether or not a physical tape volume is designated (step 141). This determination may be performed by determining whether or not the access request includes the name of the physical tape volume. First, explanation is given about the case where a physical tape volume is designated. This case may be where the access request includes the name of the physical tape volume and thus the access request is for reading the data unit or for writing the data unit additionally. In this case, the file operation module 140 may determine whether or not a control table corresponding to the physical tape volume exists (step 142).

If a control table corresponding to the physical tape volume exists, the file operation module 140 may query a record corresponding to position information in the control table (step 143). File operation module 140 may query access request for reading the data unit, the file operation module 140 may obtain the position information from the access request. Alternatively, as for the access request for writing the data unit additionally, the file operation module 140 may generate the position information based on a position on the physical tape volume where the last data unit has been stored.

Subsequently, the file operation module 140 may determine whether or not such a record exists in the reference destination (step 144). In the case where such a record exists in the reference destination, the access request may be for reading the data unit, and in the case where such a record does not exist in the reference destination, the access request may be for writing the data unit additionally. If such a record exists in the reference destination, the file operation module 140 may open a segmented virtual tape file corresponding to the record referred to (step 145). The data unit may be read out from the segmented virtual tape file.

If, at step 144, such a record does not exist in the reference destination, the file operation module 140 may create a segmented virtual tape file corresponding to the data unit handled by the host device 20 as one file and open the segmented virtual tape file (step 150). The segmented virtual tape file may correspond to the data unit believed by the host device 20 to be written additionally to the physical tape volume.

Note that, there may be a case where the data unit is requested to be written additionally to the physical tape volume although no data unit is stored in the physical tape volume. In such a case, the file operation module 140 may determine at step 142 that a control table corresponding to the physical tape volume does not exist. In this case, the file operation module 140 may create a control table corresponding to the physical tape volume (step 146). The file operation module 140 may create a segmented virtual tape file corresponding to the data unit handled by the host device 20 as one file and open the segmented virtual tape file (step 150). The segmented virtual tape file may correspond to the data unit believed by the host device 20 to be written additionally to the physical tape volume.

In step 147, an access request includes the name of the data unit and thus the access request is for writing the data unit newly to a physical tape volume from its beginning. The file operation module 140 may select a physical tape volume from plural physical tape volumes believed by the host device 20 to be available from the beginning (step 147). In step 148, file operation module 140 may determine whether or not a control table corresponding to the selected physical tape volume exists.

If a control table corresponding to the selected physical tape volume does not exist, it may indicate that no data unit is stored in the selected physical tape volume. In this case, the file operation module 140 may create a control table corresponding to the selected physical tape volume (step 146). In step 150, the file operation module 140 may create a segmented virtual tape file corresponding to the data unit handled by the host device 20 as one file and open the segmented virtual tape file. The segmented virtual tape file may correspond to the data unit believed by the host device 20 to be written newly to the physical tape volume from its beginning.

If a control table corresponding to the selected physical tape volume exists, it may indicate that all data units stored in the selected physical tape volume are allowed to be overwritten. In this case, the file operation module 140 may delete all records in the control table corresponding to the selected physical tape volume and all segmented virtual tape files corresponding to the records in the control table (step 149). In step 150, the file operation module 140 may create a segmented virtual tape file corresponding to the data unit handled by the host device 20 as one file and open the segmented virtual tape file. The segmented virtual tape file may correspond to the data unit believed by the host device 20 to be written newly to the physical tape volume from its beginning.

After completion of creation of the segmented virtual tape file at step 150, the file operation module 140 may insert a record corresponding to the segmented virtual tape file in the control table, although not illustrated in the flowchart representing the operation until the file operation module 140 opens the segmented virtual tape file.

In an exemplary embodiment, when a data unit is deleted from the host device 20, the VTS 10 may delete a segmented virtual tape file corresponding to the data unit from the HDD 160. Furthermore, when a data unit is updated on the host device 20, the VTS 10 may create a segmented virtual tape file corresponding to the updated data unit in the HDD 160 according to the flowchart shown in FIG. 7. In this case, since a segmented virtual tape file corresponding to the data unit before the update may be unnecessary, the VTS 10 may delete such segmented virtual tape file from the HDD 160.

Figure 8:
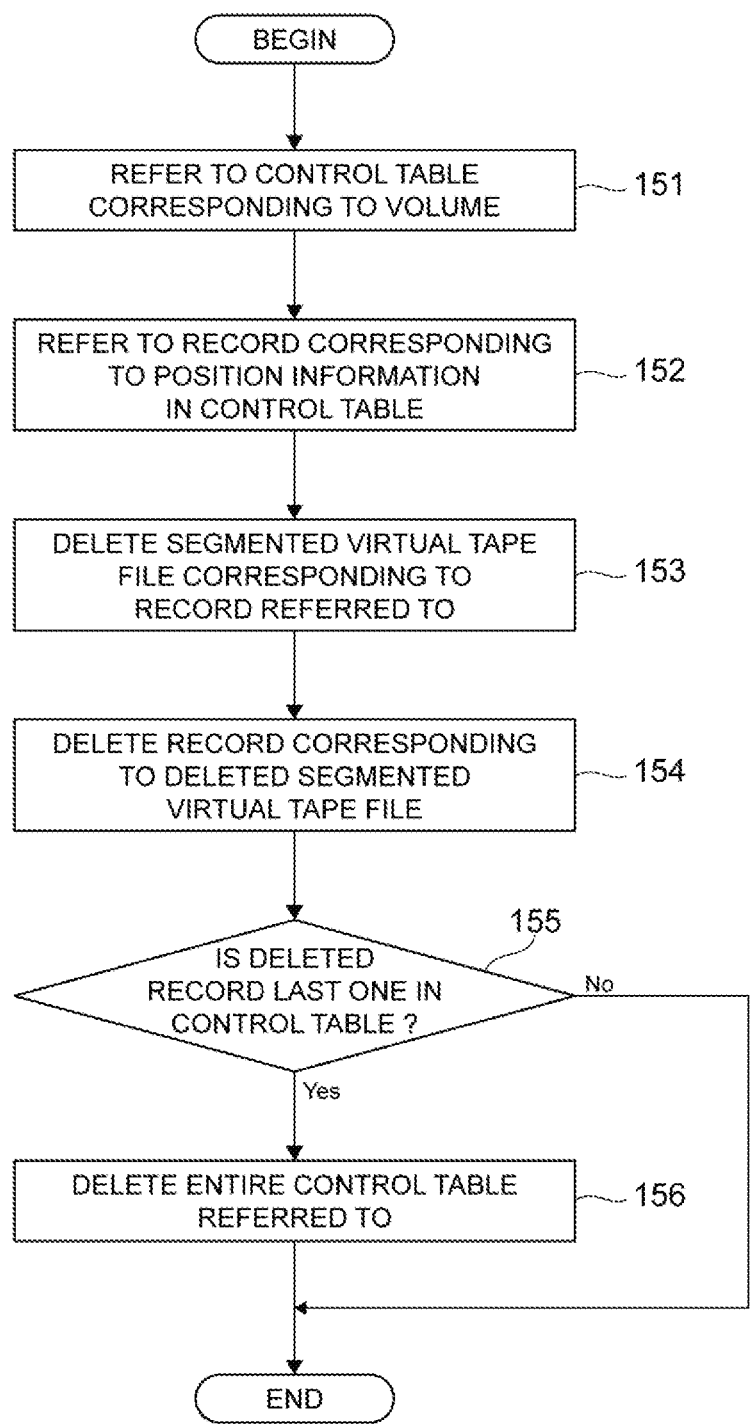
FIG. 8 depicts a flowchart representing exemplary operation of the VTS according to a preferred exemplary embodiment of the present invention.

Referring to FIG. 8, FIG. 8 depicts a flowchart representing an exemplary operation of the VTS 10 performed when a segmented virtual tape file is deleted in the manner as stated above. In this flowchart, the VTS 10 is assumed to individually receive information about the data unit believed by the host device 20 to be stored in a physical tape volume and to be made obsolete by deletion or update of the data unit.

When the host device 20 makes a deletion request, the accepting module 120 may accept it. The deletion request may include the name of the physical tape volume, the name of the data unit, and the aforementioned position information. In response to an acceptance of the deletion request by the accepting module 120, the file operation module 140 may start this operation.

Referring to FIG. 8, the file operation module 140 may refer to the control table corresponding to the physical tape volume (step 151). The physical tape volume may be identified based on the name of the physical tape volume included in the deletion request.

The file operation module 140 may refer to a record corresponding to the position information in the control table (step 152). The position information may be obtained from the deletion request. The file operation module 140 may delete a segmented virtual tape file corresponding to the record referred to (step 153). The segmented virtual tape file may be identified based on the name of the segmented virtual tape file included in the record. The file operation module 140 may delete the record corresponding to the deleted segmented virtual tape file (step 154). That is, the file operation module 140 may delete the record referred to at step 152.

In step 155, the file operation module 140 may determine whether or not the deleted record is the last one in the control table. If the deleted record is not the last one in the control table, the file operation module 140 may end the operation. If the deleted record is the last one in the control table, the file operation module 140 may delete the entire control table referred to (step 156).

It will be appreciated by those in the art that, although not shown in the flowcharts of FIGS. 7 and 8, the VTS 10 may perform data migration from/to the HDD 160 to/from the physical tape library 30 per-segmented-virtual-tape-file basis, in the case where the VTS 10 supports the HSM.

In an alternative exemplary embodiment, the control table in the operation module 140 may contain plural records, each including a correspondence between the name of a data unit and the name of a segmented virtual tape file including the data unit, unlike the control table shown in FIG. 6. In this case, when making an access request to the data unit, the host device 20 may send the name of the physical tape volume and the name of the data unit.

Then, the VTS 10 first makes access to a control table corresponding to the physical tape volume. Next, the VTS 10 may obtain from the control table the name of a corresponding segmented virtual tape file, based on the name of the data unit sent by the host device 20. After that, the VTS 10 may make access to the segmented virtual tape file including the data unit.

In an alternative exemplary embodiment, the name of the physical tape volume may be added to each of the plural records in the control table. The record in the control table may be regarded as one example of association information associating the first file with the specific virtual sequential access volume and the first data.

Figure 9:
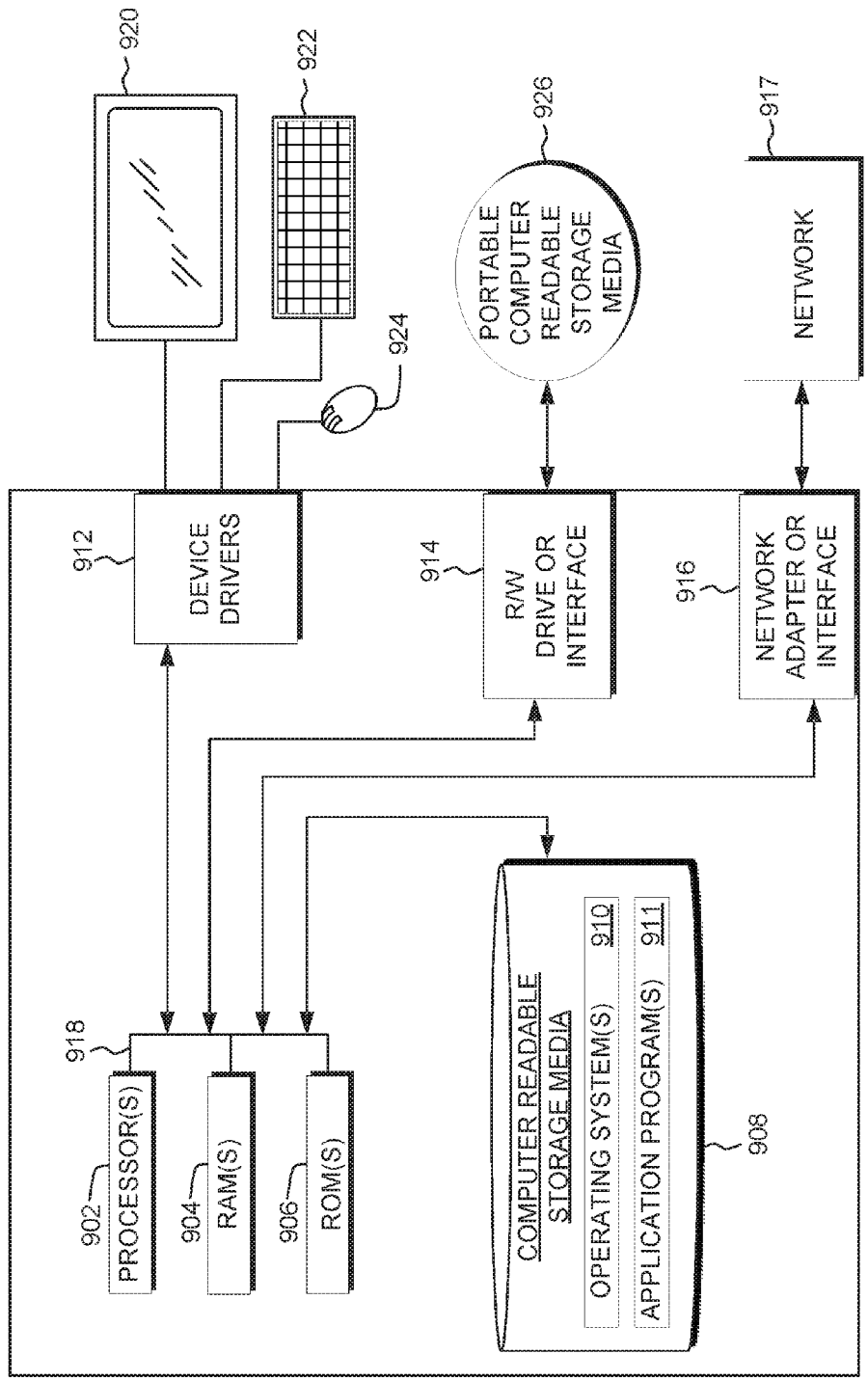
FIG. 9 depicts a block diagram of components of the server computer executing an application, in accordance with an embodiment of the present invention.

Referring to FIG. 9, FIG. 9 depicts a block diagram of components of a computing device performing the present invention. For example, VTS 10 of FIG. 2, in accordance with an embodiment of the present invention. It should be appreciated that FIG. 9 provides only an illustration of one implementation and does not imply any limitations with regard to the environments in which different embodiments may be implemented. Many modifications to the depicted environment may be made.

VTS 10 may include one or more processors 902, one or more computer-readable RAMs 904, one or more computer-readable ROMs 906, one or more computer readable storage media 908, device drivers 912, read/write drive or interface 914, network adapter or interface 916, all interconnected over a communications fabric 918. Communications fabric 918 may be implemented with any architecture designed for passing data and/or control information between processors (such as microprocessors, communications and network processors, etc.), system memory, peripheral devices, and any other hardware components within a system.

One or more operating systems 910, and one or more application programs 911, for example, accepting module 120 and file operations module 140, are stored on one or more of the computer readable storage media 908 for execution by one or more of the processors 902 via one or more of the respective RAMs 904 (which typically include cache memory). In the illustrated embodiment, each of the computer readable storage media 908 may be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

VTS 10 may also include a R/W drive or interface 914 to read from and write to one or more portable computer readable storage media 926. Application programs 911 on VTS 10 may be stored on one or more of the portable computer readable storage media 926, read via the respective R/W drive or interface 914 and loaded into the respective computer readable storage media 908.

VTS 10 may also include a network adapter or interface 916, such as a TCP/IP adapter card or wireless communication adapter (such as a 4G wireless communication adapter using OFDMA technology) for connection to a network 917. Application programs 911 on VTS 10 may be downloaded to the computing device from an external computer or external storage device via a network (for example, the Internet, a local area network or other wide area network or wireless network) and network adapter or interface 916. From the network adapter or interface 916, the programs may be loaded onto computer readable storage media 908. The network may comprise copper wires, optical fibers, wireless transmission, routers, firewalls, switches, gateway computers and/or edge servers.

VTS 10 may also include a display screen 920, a keyboard or keypad 922, and a computer mouse or touchpad 924. Device drivers 912 interface to display screen 920 for imaging, to keyboard or keypad 922, to computer mouse or touchpad 924, and/or to display screen 920 for pressure sensing of alphanumeric character entry and user selections. The device drivers 912, R/W drive or interface 914 and network adapter or interface 916 may comprise hardware and software (stored on computer readable storage media 908 and/or ROM 906).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

Based on the foregoing, a computer system, method, and computer program product have been disclosed. However, numerous modifications and substitutions can be made without deviating from the scope of the present invention. Therefore, the present invention has been disclosed by way of example and not limitation.

What is claimed is:

1. A computer-implemented method for providing access to a plurality of virtual sequential access volumes by using random access media, the method comprising:
   receiving an access request, the access request comprising the name of a first data unit;
   in response to determining that a physical tape volume is not designated in the access request:
   selecting a primary physical tape volume; and
   in response to detecting a control table associated with the selected physical tape volume, deleting all records of the control table;
   generating a segmented virtual tape file associated with the first data unit;
   writing the first data unit to a specific virtual sequential access volume of the plurality of virtual sequential access volumes; and
   storing a first file including the first data unit in the random access media, the first file being separate from a second file including a second data unit stored in the random access media in response to an operation for writing the second data unit to the specific virtual sequential access volume.

2. The method of claim 1, further comprising storing association information associating the first file with the specific virtual sequential access volume and position data of the first data unit in the specific virtual sequential access volume.

3. The method of claim 2, further comprising:
receiving a plurality of designation data of the specific virtual sequential access volume and position data in the specific virtual sequential access volume; and
identifying the first file associated with the specific virtual sequential access volume and the position data by the association information.

4. The method of claim 3, further comprising:
deleting the first data unit;
deleting the first file identified by the association information; and
deleting the association information.

5. The method of claim 3, further comprising:
updating the first data unit;
storing a third file including a third data unit in the random access media, the third data unit being obtained by updating the first data unit, the third file being separate from both the first file and the second file;
deleting the first file identified by the association information; and
deleting the association information.

6. The method of claim 1, further comprising storing association information associating the first file with the specific virtual sequential access volume and the first data unit.

7. The method of claim 6, further comprising:
accepting a designation of the specific virtual sequential access volume and the first data unit; and
identifying the first file associated with the specific virtual sequential access volume and the first data unit by the association information.

8. The method of claim 1, further comprising migrating the first file stored in the random access media to a physical sequential access volume, separately from the second file stored in the random access media.

9. A computer program product for generating an index for a table in a database, the computer program product comprising:
one or more computer-readable storage media and program instructions stored on the one or more computer-readable storage media, the program instructions comprising:
instructions to receive an access request, the access request comprising the name of a first data unit;
in response to determining that a physical tape volume is not designated in the access request:
selecting a primary physical tape volume; and
in response to instructions to detect a control table associated with the selected physical tape volume, deleting all records of the control table;
instructions to generate a segmented virtual tape file associated with the first data unit;
instructions to write the first data unit to a specific virtual sequential access volume of the plurality of virtual sequential access volumes; and
instructions to store a first file including the first data unit in the random access media, the first file being separate from a second file including a second data unit stored in the random access media in response to an operation for writing the second data unit to the specific virtual sequential access volume.

10. The computer program product of claim 9, further comprising instructions to store association information associating the first file with the specific virtual sequential access volume and position data of the first data unit in the specific virtual sequential access volume.

11. The computer program product of claim 10, further comprising:
instructions to receive a plurality of designation data of the specific virtual sequential access volume and position data in the specific virtual sequential access volume; and
instructions to identify the first file associated with the specific virtual sequential access volume and the position data by the association information.

12. The computer program product of claim 11, further comprising:
instructions to delete the first data unit;
instructions to delete the first file identified by the association information; and
instructions to delete the association information.

13. The computer program product of claim 11, further comprising:
instructions to update the first data unit;
instructions to store a third file including. third data unit in the random access media, the third data unit being obtained by updating the first data unit, the third file being separate from both the first file and the second file;
instructions to delete the first file identified by the association information; and
instructions to delete the association information.

14. The computer program product of claim 9, further comprising instructions to store association information associating the first file with the specific virtual sequential access volume and the first data unit.

15. The computer program product of claim 14, further comprising:
instructions to accept a designation of the specific virtual sequential access volume and the first data unit; and
instructions to identify the first file associated with the specific virtual sequential access volume and the first data unit by the association information.

16. The computer program product of claim 9, further comprising instructions to migrate the first file stored in the random access media to a physical sequential access volume, separately from the second file stored in the random access media.

17. A computer system for generating an index for a table in a database, the computer system comprising:
one or more computer processors;
one or more computer-readable storage media;
program instructions stored on the computer-readable storage media for execution by at least one of the one or more processors, the program instructions comprising:
instructions to receive an access request, the access request comprising the name of a first data unit;
in response to determining that a physical tape volume is not designated in the access request:
selecting a primary physical tape volume; and
in response to instructions to detect a control table associated with the selected physical tape volume, deleting all records of the control table;
instructions to generate a segmented virtual tape file associated with the first data unit;
instructions to write the first data unit to a specific virtual sequential access volume of the plurality of virtual sequential access volumes; and
instructions to store a first file including the first data unit in the random access media, the first file being separate from a second file including a second data unit stored in the random access media in response to an operation for writing the second data unit to the specific virtual sequential access volume.

18. The computer system of claim 17, further comprising instructions to store association information associating the first file with the specific virtual sequential access volume and position data of the first data unit in the specific virtual sequential access volume.

19. The computer system of claim 18, further comprising:
- instructions to receive a plurality of designation data of the specific virtual sequential access volume and position data in the specific virtual sequential access volume; and
- instructions to identify the first file associated with the specific virtual sequential access volume and the position data by the association information.

20. The computer system of claim 19, further comprising:
instructions to delete the first data unit;
instructions to delete the first file identified by the association information; and
instructions to delete the association information.

* * * * *